(12) United States Patent
Tamehira et al.

(10) Patent No.: US 6,449,459 B2
(45) Date of Patent: Sep. 10, 2002

(54) IMAGE FORMING APPARATUS

(75) Inventors: Masato Tamehira; Toyokazu Mori, both of Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/753,031

(22) Filed: Jan. 2, 2001

(30) Foreign Application Priority Data

Jan. 25, 2000 (JP) ........................................ 2000-015333

(51) Int. Cl.[7] .............................................. G03G 15/00
(52) U.S. Cl. ........................................................ 399/405
(58) Field of Search ................................ 399/107, 110, 399/124, 397, 403, 404, 405; 271/207, 213, 220, 223

(56) References Cited

U.S. PATENT DOCUMENTS

| 5,033,731 A | * | 7/1991 | Looney ................... 271/207 X |
| 5,216,474 A | * | 6/1993 | Nakao .................... 399/405 X |
| 5,746,528 A | | 5/1998 | Mayer et al. ............... 400/625 |
| 5,839,025 A | * | 11/1998 | Okauchi et al. ......... 399/405 X |
| 5,920,758 A | * | 7/1999 | Ohtsuki ....................... 399/405 |
| 5,988,621 A | * | 11/1999 | Kondo et al. ........... 271/223 X |

FOREIGN PATENT DOCUMENTS

| JP | 61-175491 | 11/1986 |
| JP | 05278921 | 10/1993 |
| JP | 05278921 A | 10/1993 |
| JP | 11193166 | 7/1999 |

OTHER PUBLICATIONS

European Search Report, Application No. EP 01 30 0689, dated May. 2001.

* cited by examiner

*Primary Examiner*—Sandra Brase
(74) *Attorney, Agent, or Firm*—Renner, Otto, Boisselle & Sklar

(57) ABSTRACT

In an image forming apparatus in which the paper output portion is arranged under the scanner portion and over the main part including a paper feed cassette, image forming portion and control panel, a box-like paper output tray without lid is provided in the paper output portion. This paper output tray has a transparent shroud formed upright with respect to the tray bottom along the edge of the paper output tray and positioned at the front side of the image forming apparatus when the tray is folded up into the paper output portion. This paper output tray is pivotally supported on the main part by the vertical shaft arranged at the front right corner thereof. The paper output tray can swivel in the horizontal plane so that the printed sheets held in the paper output tray can be easily picked up by turning the tray forwards with respect to the image forming apparatus.

17 Claims, 10 Drawing Sheets

IMAGE FORMING APPARATUS

BACKGROUND OF THE INVENTION

(1) Field of the Invention

The present invention relates to an image forming apparatus such as a laser printer, copier, facsimile machine and the like, and in particular, relates to an image forming apparatus having a discharge and pickup arrangement for receiving printouts discharged to the paper output portion therein.

(2) Description of the Prior Art

Conventionally, a typical paper output tray 24 used in an image forming apparatus such as a copier, printer, multi-functional machine and the like is fixed to the side panel of the image forming apparatus as shown in FIG. 1 and is extended from the image forming machine body to the outer side. Therefore, such image forming apparatus needs a large footprint, which has been a critical obstacle against miniaturization.

In order to solve this problem, Japanese Patent Application Laid-Open Hei 5 No.278921 discloses a configuration of a paper output tray which is disposed in the depressed portion at the paper exit of the image forming apparatus and can be folded and folded out. This paper output tray is made of a thin resin sheet having a corrugated configuration with many folds. When the image forming apparatus is not used, the paper output tray can be folded or retracted into the depressed portion at the output paper exit, thus reducing the footprint. When the apparatus is operated for printing etc., the paper output tray is folded out so that the output paper can be received thereon without any loss of usual usefulness.

However, in the paper output tray of the image forming apparatus disclosed in Japanese Patent Application Laid-Open Hei 5 No.278921, the paper output tray can be folded up when the image forming apparatus is unused but it must be stretched out to the paper output side when the machine is used. Therefore, the merit of reducing the footprint of the image forming apparatus is not so beneficial. Therefore, in a circumstance under which the machine is infrequently used, the paper output tray can be inserted into the image forming apparatus body so as to reduce the footprint. However, in an expected usual use environment, tedious work is needed for retracting and folding out the paper output tray, resulting in inconvenience.

Recently, instead of the paper output tray stretched out from the side panel of the image forming apparatus, so-called wingless image forming apparatuses, which have a hollow for paper output inside the body of the image forming apparatus, have been developed. In a wingless image forming apparatus, the paper output portion is typically located over the paper feed portion and under the original reading portion.

In an apparatus having the paper output portion positioned as such, when large paper is used for printouts, the user is able to easily know the presence of printouts and the necessity of removal. However, if small paper is used for printouts, such paper will not extend out from the space of the paper output portion, so it is likely that the user look over the discharged printouts and may miss picking it up.

SUMMARY OF THE INVENTION

The present invention has been devised in order to solve the above problem and it is therefore an object of the present invention to provide a wingless-type image forming apparatus which allows the user to readily remove printouts without failing to pick up the discharged paper.

In order to achieve the above object, the present invention is configured as follows:

In accordance with the first aspect of the present invention, an image forming apparatus includes:

- a main part including a printer portion for printing the information of scanned originals and a paper feed portion for feeding print paper to the printer portion;
- an original reading portion for reading originals; and
- a paper output portion disposed under the original reading portion for receiving printed paper, and is characterized in that the paper output portion includes a paper output tray pivotally supported at a corner thereof so as to swivel in the horizontal plane, and the original reading portion overlaps at least part of the paper output tray.

In accordance with the second aspect of the present invention, the image forming apparatus having the above first feature is characterized in that a transparent shroud is formed upright with respect to the tray bottom for receiving printed paper, along the edge of the paper output tray on the front side of the main part.

In accordance with the third aspect of the present invention, the image forming apparatus having the above first feature is characterized in that an elastic element is provided for the paper output tray so that it is hooked to the main part.

In accordance with the fourth aspect of the present invention, the image forming apparatus having the above second feature is characterized in that an elastic element is provided for the paper output tray so that it is hooked to the main part.

In accordance with the fifth aspect of the present invention, the image forming apparatus having the above first feature is characterized in that the paper output tray has an aligner for aligning printed sheets.

In accordance with the sixth aspect of the present invention, the image forming apparatus having the above second feature is characterized in that the paper output tray has an aligner for aligning printed sheets.

In accordance with the seventh aspect of the present invention, the image forming apparatus having the above third feature is characterized in that the paper output tray has an aligner for aligning printed sheets.

In accordance with the eighth aspect of the present invention, the image forming apparatus having the above fourth feature is characterized in that the paper output tray has an aligner for aligning printed sheets.

In accordance with the ninth aspect of the present invention, the image forming apparatus having one of the above fifth to eighth features is characterized in that the aligner is a moving presser for pressing the printed sheet from the top face thereof.

In accordance with the tenth aspect of the present invention, the image forming apparatus having one of the above fifth to eighth features is characterized in that the aligner is a moving member which can move in the direction perpendicular to the conveyance direction of printed sheets.

In accordance with the eleventh aspect of the present invention, an image forming apparatus comprising:

- a main part including a printer portion for printing the information of scanned originals and a paper feed portion for feeding print paper to the printer portion;
- an original reading portion for reading originals; and
- a paper output portion disposed in a space under the original reading portion for receiving printed paper and enclosed by the printer portion and paper feed portion, and is characterized in that the paper output portion includes a paper output tray pivotally supported at a corner thereof so as to swivel in the horizontal plane.

In the first and eleventh configurations, the image forming apparatus includes: a main part having a printer portion and a paper feed portion; an original reading portion; and a paper output portion disposed under the original reading portion. The paper output portion of the image forming apparatus includes a paper output tray pivotally supported at one corner thereof so as to swivel in the horizontal plane. Therefore, it is possible for the user to easily pick up discharged printed sheets by pulling out the paper output tray without the necessity of bending over to check the paper output portion. Further, even if relatively small-sized print sheets such as postcards are used, the user will not miss picking them up. This contributes to improvement in handling the image forming apparatus.

In the second configuration, the paper output tray provided in the paper output portion has a transparent shroud which is formed upright with respect to the tray bottom for receiving printed paper, along the edge of the paper output tray on the front side of the main part. Therefore, it is possible to easy monitor whether printed sheets are discharged on the paper output tray.

In the third and fourth configurations, an elastic element is provided for the paper output tray so that the tray is hooked to the main part of the image forming apparatus. Therefore, the paper output tray will return to its original position by the function of the elastic element after its being drawn out. Thus, the user does not need to reset the paper output tray to the initial position after picking up printouts from the tray. This contributes to improvement in handling the image forming apparatus.

In the fifth to eighth configurations, the paper output tray provided in the paper output portion has an aligner for aligning printed sheets discharged from the image forming apparatus. Therefore, a multiple number of discharged printed sheets in the paper output portion of the image forming apparatus can be aligned by the aligner. As a result, the printed sheets picked up from the paper output tray can be handled easily.

In the ninth configuration, the paper output tray provided in the paper output portion has a movable aligner for aligning the printed sheets discharged from the image forming apparatus, by pressing them from the top. Therefore the printed sheets discharged in the paper output tray can be aligned with respect to the direction of discharge.

In the tenth configuration, the paper output tray provided in the paper output portion has movable aligners which can move with respect to the sheet conveying direction and the direction perpendicular to it. Therefore, the printed sheets discharged in the paper output tray can be aligned along both the sheet conveying direction and the direction perpendicular to it.

In the above first and eleventh configurations, when a drive mechanism for swiveling the paper output tray is provided, the paper output tray can be turned by the drive mechanism. Therefore, the user of the image forming apparatus will never miss picking up the printed sheets discharged on the paper output tray.

DESCRIPTION OF THE PREFERRED EMBODIMENTS

Figure 1:
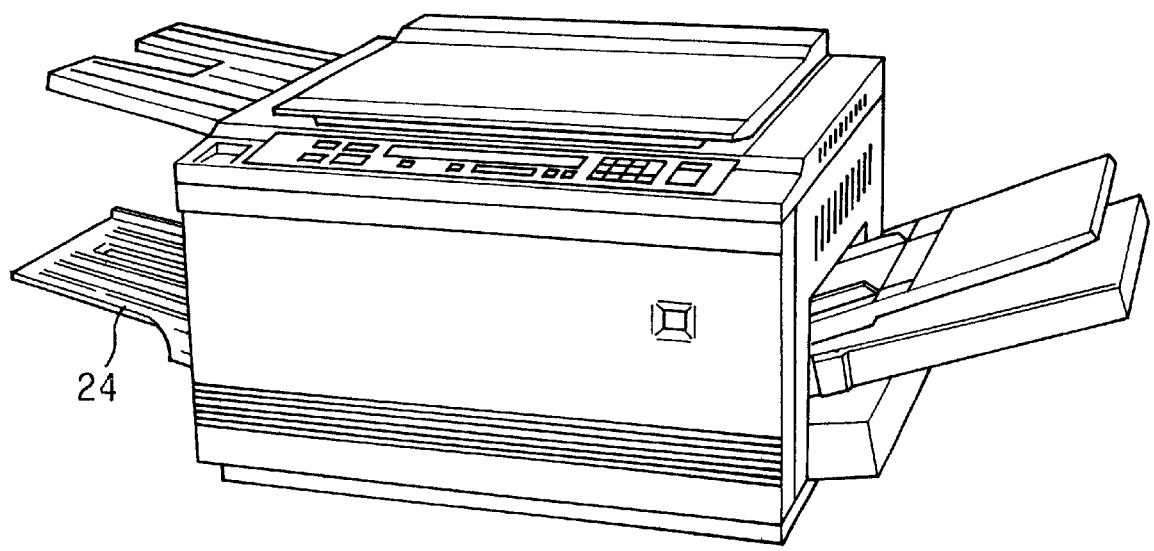
FIG. 1 is a perspective view showing the appearance of a conventional image forming apparatus.
Figure 2A:
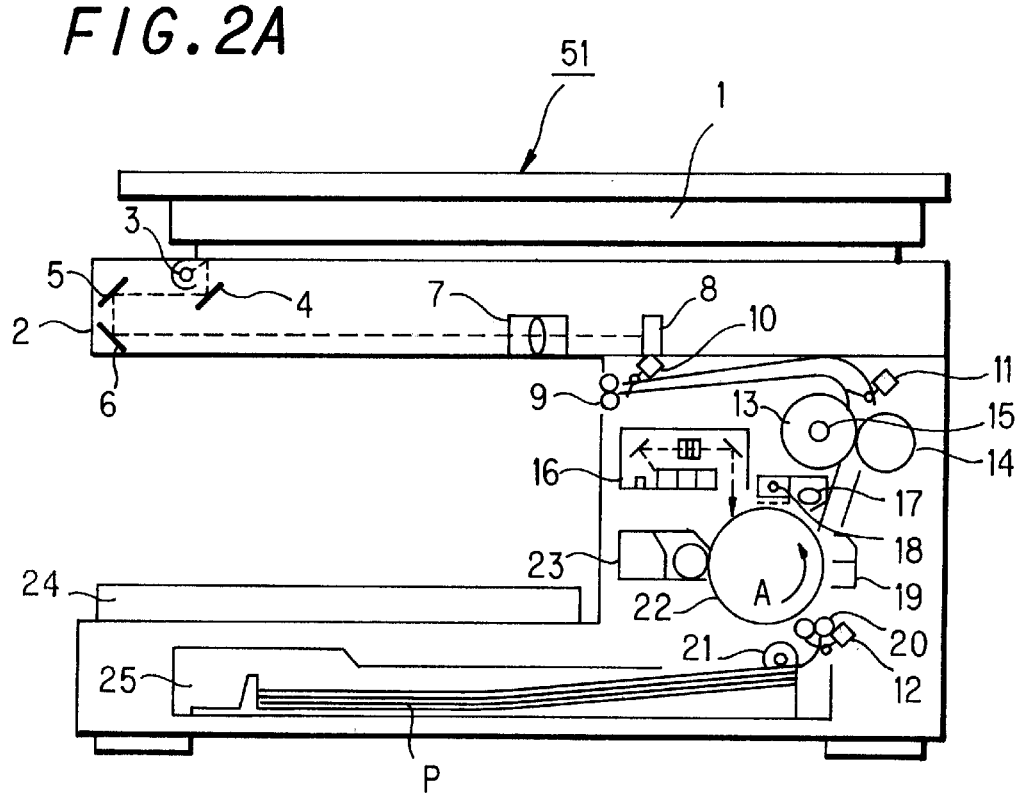
FIGS. 2A and 2B are schematic views showing the configurations of image forming apparatus in accordance with the embodiment of the present invention.
Figure 2B:
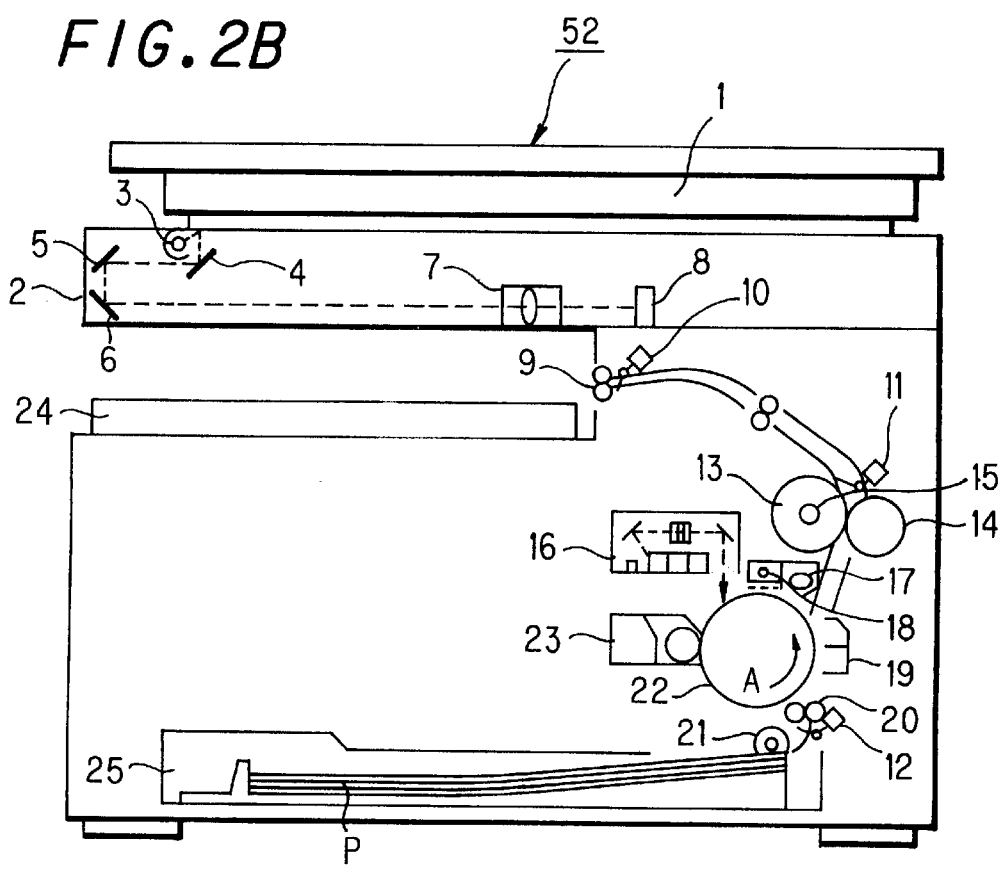

The configuration of an image forming apparatus in accordance with an embodiment of the present invention will be described with reference to FIGS. 2A and 2B. FIGS. 2A and 2B are schematic views showing the configurations of image forming apparatus in accordance with the embodiment of the present invention. FIG. 2A shows a wingless image forming apparatus 51 having an image reading portion over a paper output portion, an image forming portion with a printout exit on the side of the paper output portion and a paper feed portion under the paper output portion. FIG. 2B shows a wingless image forming apparatus 52 having an image reading portion over a paper output portion, a printout exit on the side of the paper output portion and a paper feed portion and image forming portion under the paper output portion. Since the configurations of individual components in the two image forming apparatuses are the same though their layouts are different, description hereinbelow will be made with reference to the image forming apparatus 51 shown in FIG. 2A.

Though not illustrated, other than the image forming apparatus shown in FIGS. 2A and 2B, there exist wingless image forming apparatus of a separation type in which a separate original reading unit is supported by means of vertical supports over an image forming unit and other units so as to create the space for paper output portion below the original reading unit. In such an apparatus, the separate unit is connected to the main part by means of cables and the like.

Image forming apparatus 51 is comprised of an original reading portion, image forming portion, paper feed portion and paper output portion. The main part is comprised of an image forming portion, paper feed portion and paper output portion.

The original reading portion includes an original table 1 made of a transparent glass plate or the like on the top and a scanner portion 2 arranged below original table 1. Scanner portion 2 includes a light source 3 for illuminating the original placed on original table 1 with light, a photoelectric transducer (to be referred to hereinbelow as CCD) 8 for picking up the reflected light from the original, reflection mirrors 4, 5 and 6 for guiding the reflected light from the original to CCD 8 and a focusing lens 7 for forming the image on CCD 8.

As light source 3, a halogen lamp, hot-cathode fluorescent lamp, UV fluorescent lamp and the like may be preferably used.

The image forming portion has a photoreceptor drum 22 as a drum-shaped photoreceptor being rotated in the direction of the arrow A, and further includes: around photoreceptor drum 22, a main charger 18 for charging photoreceptor drum 22 at a predetermined potential; a laser scanning unit(to be referred to hereinbelow as LSU) 16 for forming a static latent image by irradiating photoreceptor drum 22 with light in accordance with the original image data which was read by CCD 8 and has been image processed; a developer unit 23 for developing the static latent image formed on the photoreceptor drum 22 surface into a toner image; a transfer charger 19 for transferring the toner image from the photoreceptor drum 22 surface to the paper; and a cleaning unit 17 for removing the leftover toner from the photoreceptor drum 22 surface.

The paper feed portion includes a paper feed cassette 25 storing print paper P. The paper feed path is comprised of a crescentic roller 21. disposed at the front end of paper feed cassette 25 for picking up print paper P, a pre-registration detecting switch 12 for detecting the passing of print paper P, a registration roller 20 for making print paper P in register with the toner image on photoreceptor drum 22 based on the signal from pre-registration detecting switch 12, a pair of fixing rollers, namely upper and lower rollers 13 and 14 for fixing the toner image onto print paper P with heat from a heater 15, a fixed sheet detecting switch 11 for detecting the passing of print paper P through the nip between upper and lower fixing rollers 13 and 14; a paper discharge detecting switch 10 for detecting the passing of print paper P through a position before paper discharge rollers 9; and paper discharge rollers 9 for discharging print paper P.

The paper output portion has a paper output tray 24 for receiving image formed print paper P discharged by paper discharger rollers 9.

When a duplication of an original is formed, the user first places the original on original table 1 and presses the start switch on an unillustrated control portion. In response to the activation signal from the start switch, light source 3 turns on and illuminates the original placed on original table 1 with light. Light source 3, reflection mirrors 4, 5 and 6 move in the auxiliary scan direction at predetermined speeds. The reflected light from the illuminated original travels along the light path shown by the broken line in FIGS. 2A and 2B, for example, and is picked up by CCD 8.

Photoreceptor drum 22 is electrified to the predetermined potential by main charger 18, then is rotated to the position opposing LSU 16. The original image data which was picked up by CCD 8 and has been image processed is supplied to LSU 16 so that LSU 16, based on the image data, emits laser beams so as to irradiate the photoreceptor drum 22 surface at the predetermined area, thus forming a static latent image.

Photoreceptor drum 22 with a static latent image formed thereon rotates in the direction of arrow A to the developing station where the static latent image is supplied with toner by means of developer unit 23 and is developed into a visible image. Photoreceptor drum 22 continues to rotate to the position where the toner image opposes transfer charger 19.

Print paper P held in paper feed cassette 25 is delivered out, sheet by sheet, by crescentic roller 21 onto the paper feed path. As print paper P passes by pre-registration detecting switch 12, the switch becomes turned on, and registration roller 20 makes the print paper P in register with the toner image on photoreceptor drum 22 based on the signal from pre-registration detecting switch 12.

The toner image on photoreceptor drum 22 is transferred to the print paper P by the function of transfer charger 19. The toner image on print paper P is fixed onto the paper with heat from heater 15 incorporated in upper fixing roller 13 and the pressure between upper and lower fixing rollers 13 and 14.

Print paper P passes through and as it does activate, fixed paper detecting switch 11 arranged in the paper feed path and then activates paper discharge detecting switch 10. In response to the signal upon the activation of paper discharge detecting switch 10, paper discharge roller 9 starts rotating to discharge print paper P. The print paper P thus discharged is placed orderly onto paper output tray 24.

Figure 3:
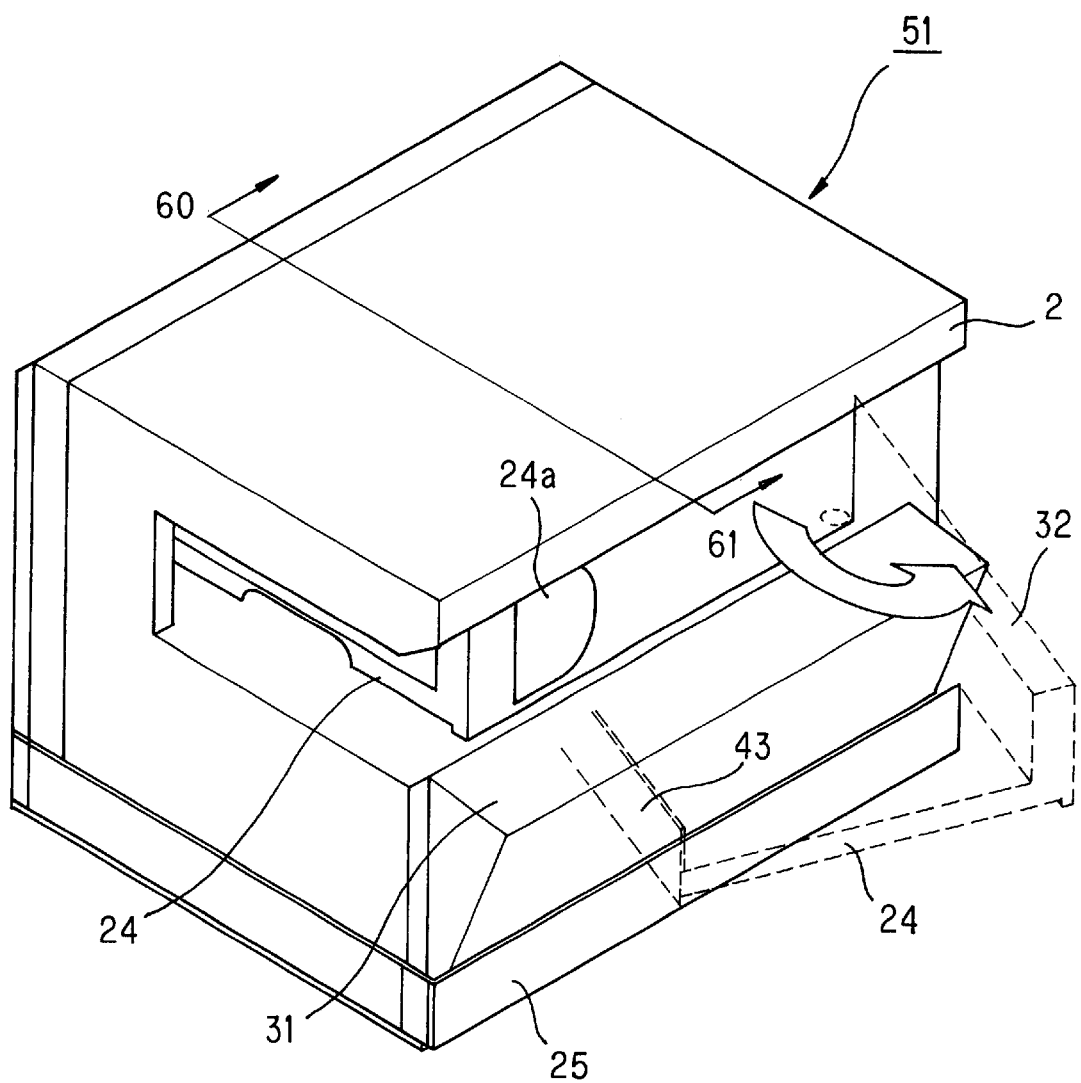
FIG. 3 is a perspective view showing the image forming apparatus shown in FIGS. 2A and 2B.
Figure 4:
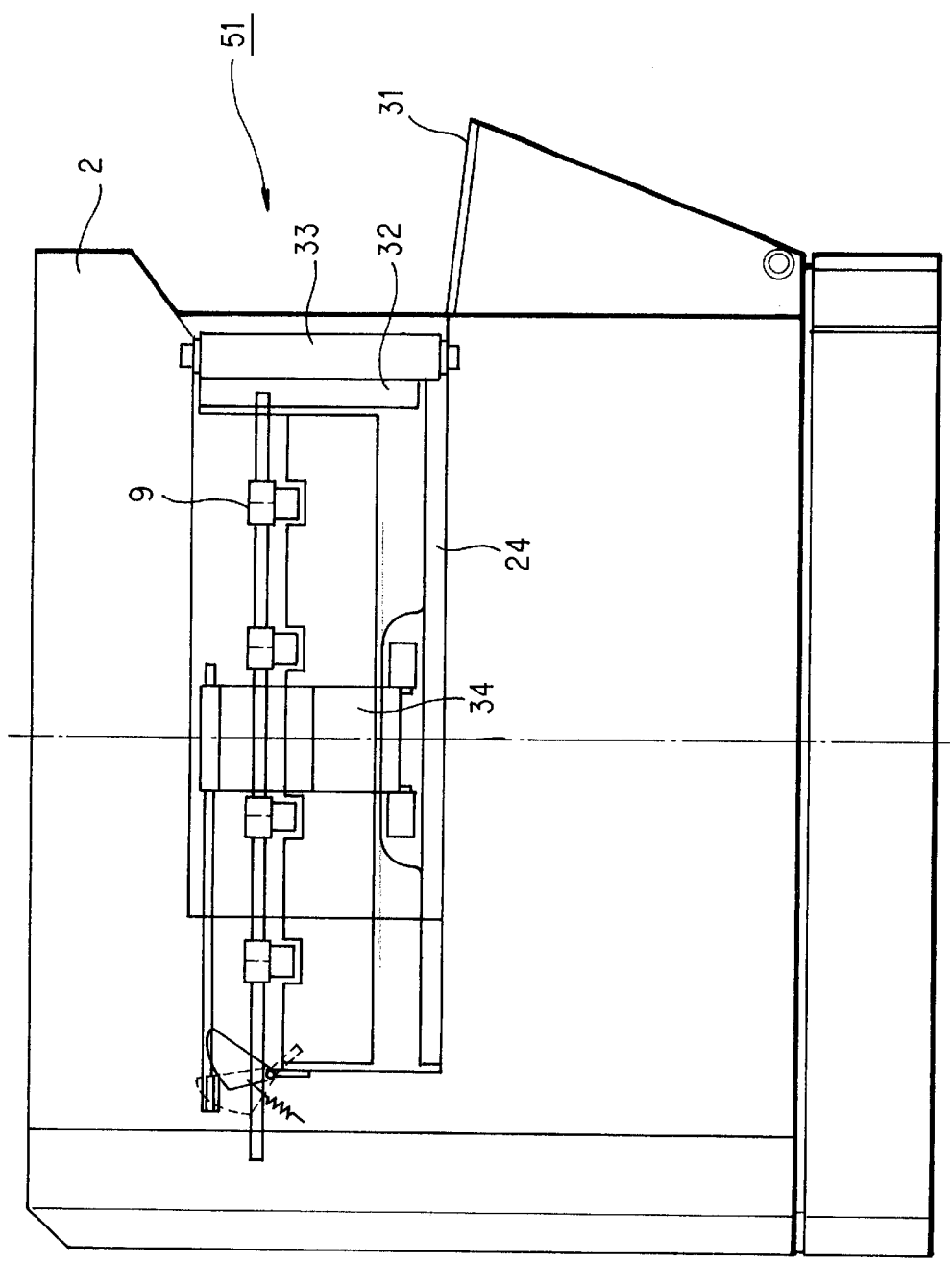
FIG. 4 is a sectional view cut along a plane 60-61 in FIG. 3.
Figure 5:
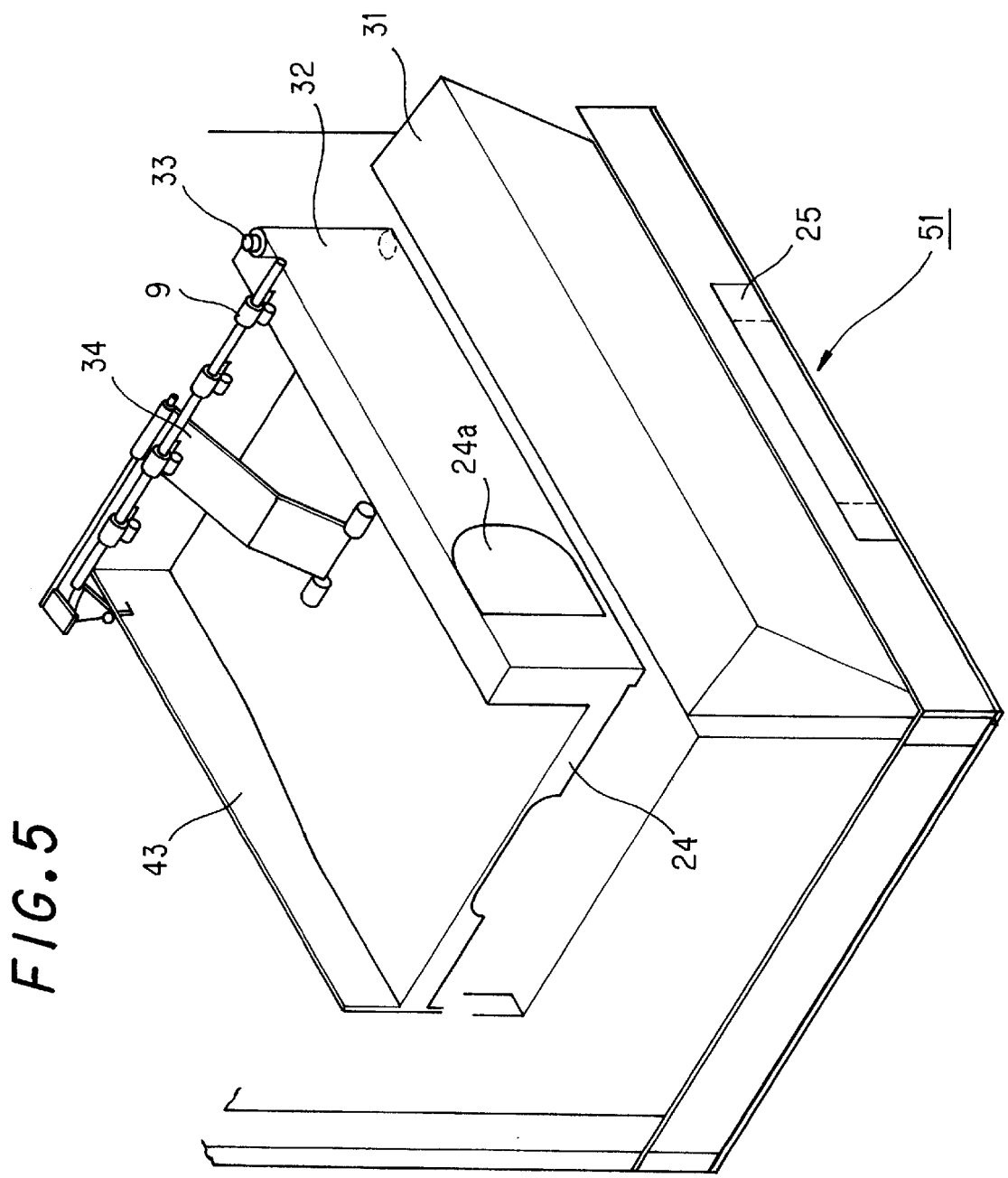
FIG. 5 is a perspective view showing the image forming apparatus with its original reading portion removed.
Figure 6:
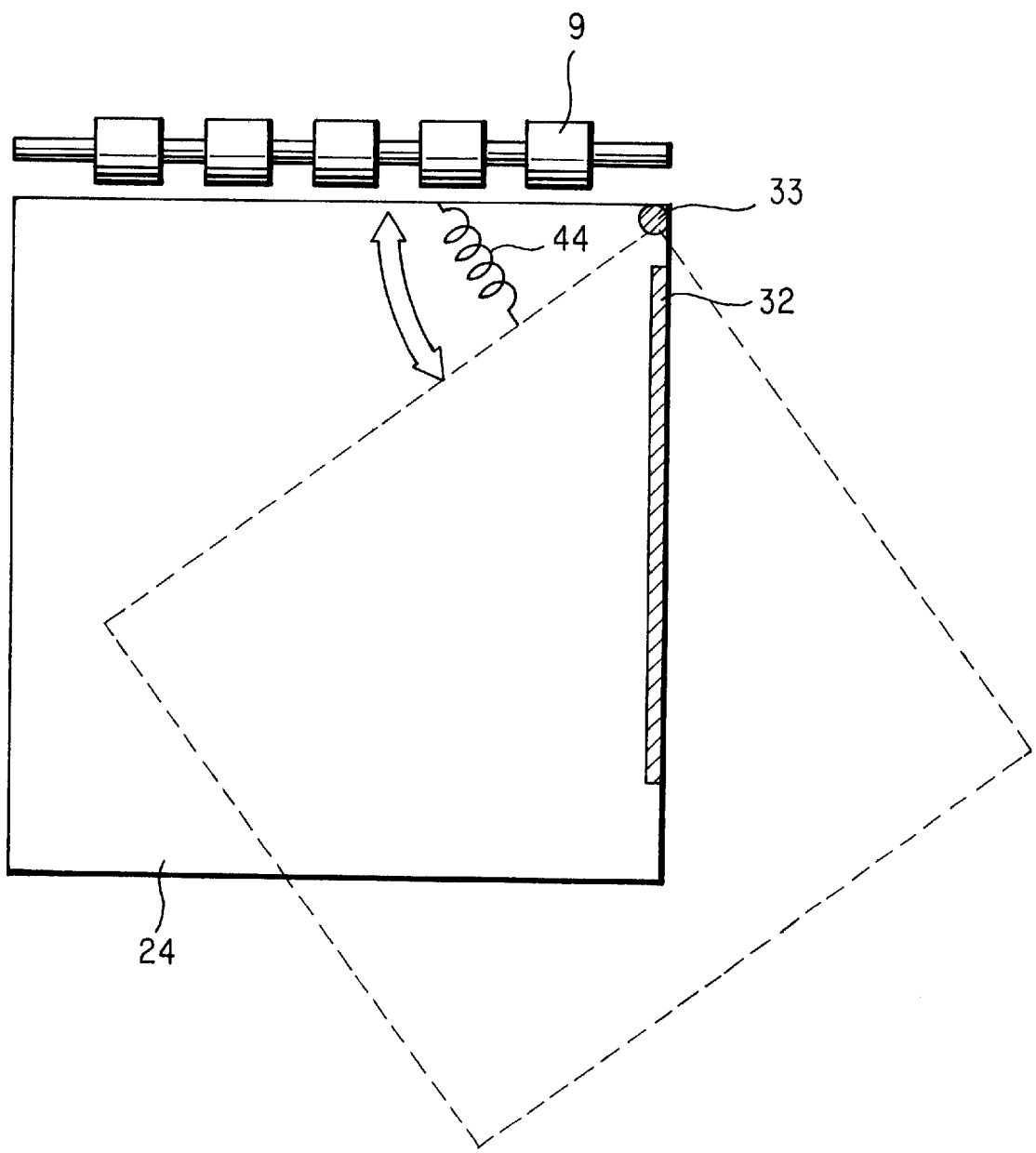
FIG. 6 is a top view showing the movement of a paper output tray.

Next, the detailed configuration of the paper output portion of the image forming apparatus in accordance with the embodiment of the present invention will be described with reference to FIGS. 3 to 6. FIG. 3 is a perspective view showing the image forming apparatus 51 shown in FIGS. 2A and 2B. FIG. 4 is a sectional view cut along a plane 60-61 in FIG. 3. FIG. 5 is a perspective view showing the image forming apparatus with its original reading portion removed. FIG. 6 is a top view showing the movement of paper output tray 24.

As stated above, in image forming apparatus 51, the paper output portion is arranged under scanner portion 2 and over the main part including paper feed cassette 25, the image forming portion and a control panel 31. Paper output tray 24 disposed in the paper output portion is a box with no lid. This paper output tray 24 has a shroud 32 formed upright with respect to the tray bottom along the edge of the paper output tray and positioned at the front side of image forming apparatus 51 when the tray is retracted into the paper output portion. The tray has another shroud 43 upright on the rear side of image forming apparatus 51 opposing shroud 32 along the other edge of the bottom part.

Further, paper output tray 24 is supported by the main part of the image forming apparatus, on a rotary axle, namely vertical support 33 at the right end of shroud 32 or the corner of paper output tray 24. Therefore, paper output tray 24 is able to swivel in the horizontal plane so that it rotates frontward of the image forming apparatus as depicted by the broken line in FIG. 3, hence print paper P placed on paper output tray 24 can be taken out easily.

In addition, shroud 32 of paper output tray 24 is formed of a transparent material. Therefore, even if the paper output tray is retracted into the paper output portion of the image forming apparatus, it is possible to readily check the presence of print paper P on paper output tray 24.

A cutout portion 24a is formed on shroud 32 so as to allow the user to hold it with the hand and pull shroud 32 out to thereby draw out paper output tray 24.

As shown in FIGS. 4 and 5, paper output tray 24 is laid out so that one end face of paper output tray 24 on the right side will abut the position above which paper discharge roller 9 of the main part of the image forming apparatus is located when paper output tray 24 is in its retracted position. Therefore, print paper P discharged from the main body is reliably placed onto paper output tray 24.

Further, as shown in FIG. 6, an elastic element 44 such as a spring is hooked between a predetermined position of paper output tray 24 and a predetermined position of the main body of the image forming apparatus. Therefore, when the user pulls out paper output tray 24 and releases the hand from paper output tray 24, paper output tray 24 can be positively returned to the initial position by the function of elastic element 44.

Moreover, an unillustrated drive mechanism configured of a motor etc., is provided at a predetermined position near vertical support 33 of paper output tray 24 so that the paper output tray will rotate by the power of this derive mechanism. This drive of paper output tray 24 by the motor is adapted to be selected through control panel 31.

The user can set up the drive of the motor through control panel 31 so that paper output tray 24 will rotate frontward of the image forming apparatus by the drive of the motor after completion of printing. By this setting, paper output tray 24 automatically comes out without the necessity of drawing out tray 24 when the printing operation of the image forming apparatus is complete, thus it is possible to positively prevent the user from forgetting to pick up the printed paper P.

In the image forming apparatus of the present invention, it is convenient for the user if the discharged print paper P can be handled easily after removal from paper output tray 24. The arrangement for this purpose, that is, for aligning the printouts P stacked on paper output tray 24 will be described next with reference to FIGS. 7 to 10.

Figure 7:
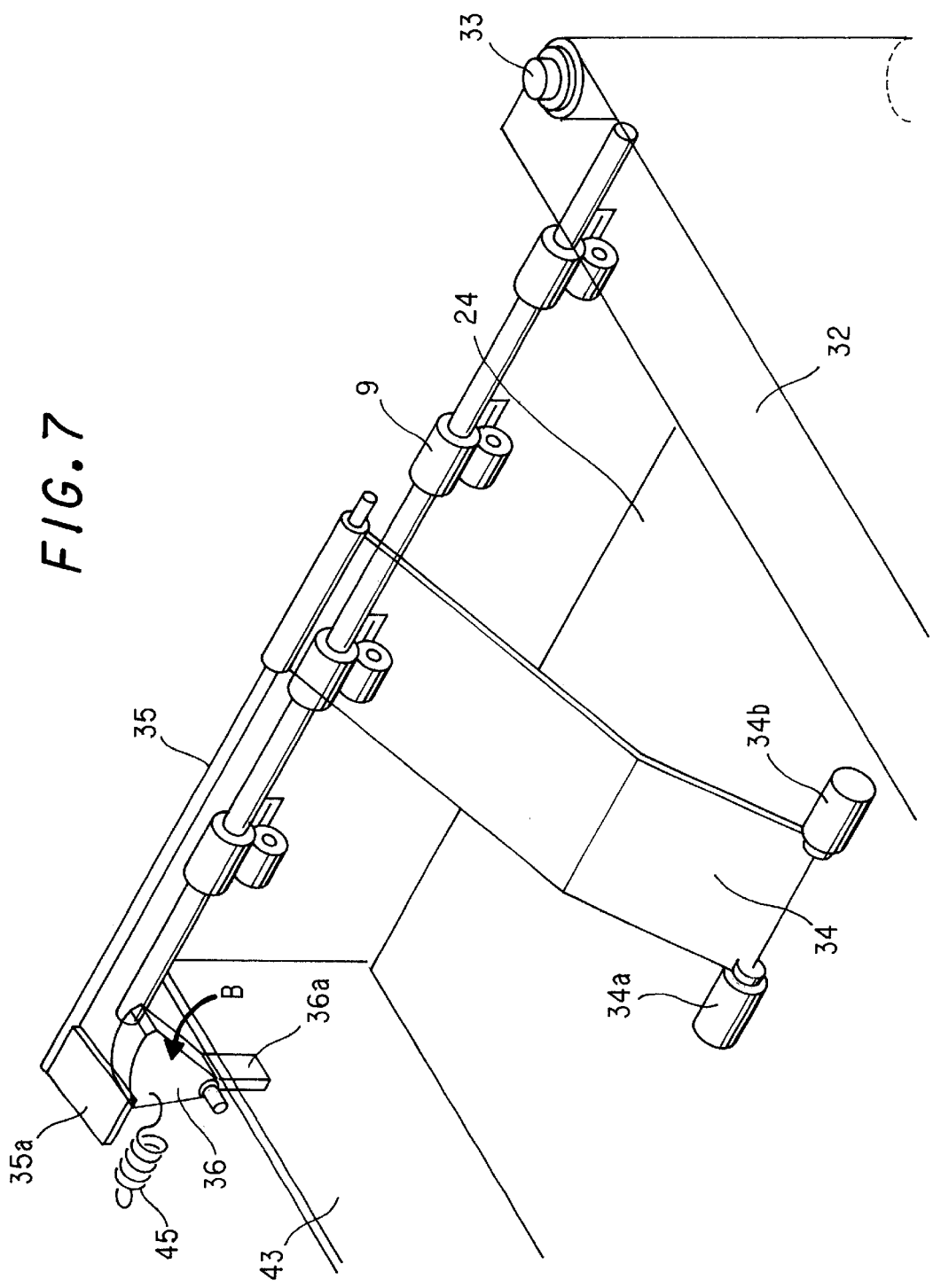
FIG. 7 is a perspective view showing in detail the paper output portion shown in FIG. 5.
Figure 8:
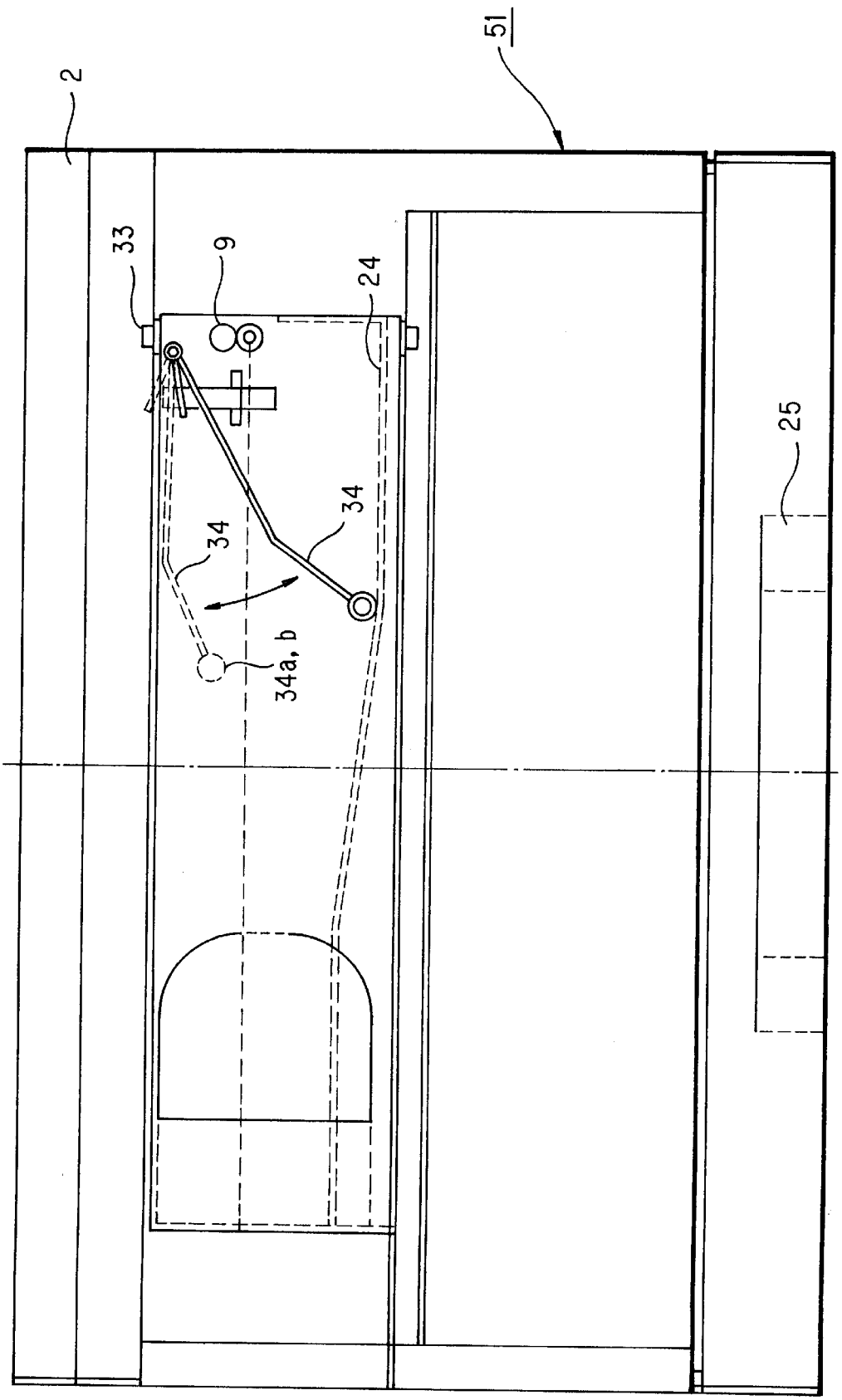
FIG. 8 is a front view showing the image forming apparatus with the paper output tray depicted in outline.

FIG. 7 is a perspective view showing in detail the paper output portion shown in FIG. 5. FIG. 8 is a front view showing the image forming apparatus with paper output tray 24 depicted in outline. In the present invention, in order to align printed sheets or printouts P discharged by paper discharge rollers 9, a printout presser 34 for pressing printouts P is provided for the paper output portion. The configuration of printout presser 34 should not be particularly limited but a paper presser 34 made of a flat plate angled obtusely at the halfway point thereof is shown in FIG. 7, as an example.

This printout presser 34 is laid out substantially parallel to the paper conveyance direction and is pivotally supported at its one end by a printout presser shaft 35 which is arranged above paper discharge roller 9 and substantially parallel with the plane on which the paper discharge roller is arranged. Printout presser 34 further has a pair of rotatably supported rollers 34a and 34b at the other end. These rollers 34a and 34b abut printout P when printout presser 34 presses printout P so that the printout P will be correctly conveyed and stored into paper output tray 24.

If printout presser 34 is fixed when paper output tray 24 is drawn out, it will collide with paper output tray 24. Therefore, a plate-like lever part 35a is provided at the other end of printout presser shaft 35. Further, a cam 36 is arranged at such a position that the cam abuts the vicinity of the end of rear shroud 43 which is provided upright on the bottom plate of paper output tray 24, opposing the front shroud 32.

Cam 36 has a triangle configuration with a predetermined thickness, having a lever 36a extended from one corner thereof. Cam 36 is pivotally supported at an axle arranged near the corner where lever 36a is. Cam 36 abuts lever part 35a of printout presser shaft 35 at a position on the side opposing the corner with lever 36a. In addition, a spring 45 is hooked between cam 36 and the main body of the image forming apparatus.

With paper output tray 24 retracted, lever 36a of cam 36 is stopped by shroud 43 of paper output tray 24. As paper output tray 24 is pulled out, spring 45 rotates cam 36 in the direction of the arrow B so as to push up lever part 35a of printout presser shaft 35.

For performing one method for aligning the printed sheets of discharged paper P, the printout presser 34 is configured so that its end with rollers 34a and 34b provided will not abut the bottom of paper output tray 24 but stops at a predetermined position. The printed sheet of paper P is discharged as it is pressed downwards by printout presser 34. When the rear end of the printed sheet P departs from paper discharge roller 9, the paper is pressed down to paper output tray 24 and placed thereon. Thus, the rear ends of printed sheets of paper P can be positioned with respect to the discharging direction of printed paper P so that the printed sheets of paper P can be discharged aligned at the predetermined position on paper output tray 24.

For performing another aligning method, printout presser 34 is configured so as to keep its end abutting the bottom of paper output tray 24. In this case, the leading end of the discharged paper will enter between printout presser 34 and the tray. Rollers 34a and 34b provided at the distal end of printout presser 34 are idly rotated by the pushing force acting on the paper during paper discharge, so the advance of the paper being discharged will not be disturbed. As printed sheets of paper P are discharged in the above way, printout presser 34 will be gradually lifted up.

When the above operation has been completed, paper output tray 24 is drawn out by handling the cutout portion on the front shroud of paper output tray 24 in order to pick up a predetermined number of printed sheets P. Upon this action, cam 36 with its lever part 36a having been stopped by rear shroud 43 of paper output tray 24 becomes movable. Therefore, the cam rotates in the direction of arrow B by the urging force of spring 45 so as to lift up lever part 35a of printout presser shaft 35 fixed and joined to presser 34. Resultantly, presser 34 rotates about its end at which it is joined to printout presser shaft 35 and lifts to the predetermined position avoiding interference with paper output tray 24 when the tray is pulled out.

Further, an unillustrated drive mechanism for rotating cam 36 is coupled to the shaft of cam 36 so that the printout presser is positioned at the position indicated by the broken line in FIG. 8 until a printed sheet P comes out. When the leading end of printed sheet P reaches the point below rollers 34a and 34b disposed at the end of printout presser 34, the printout presser 34 is moved to the position indicated by the solid line. This arrangement makes it possible to avoid the printed sheet P jamming.

Figure 9:
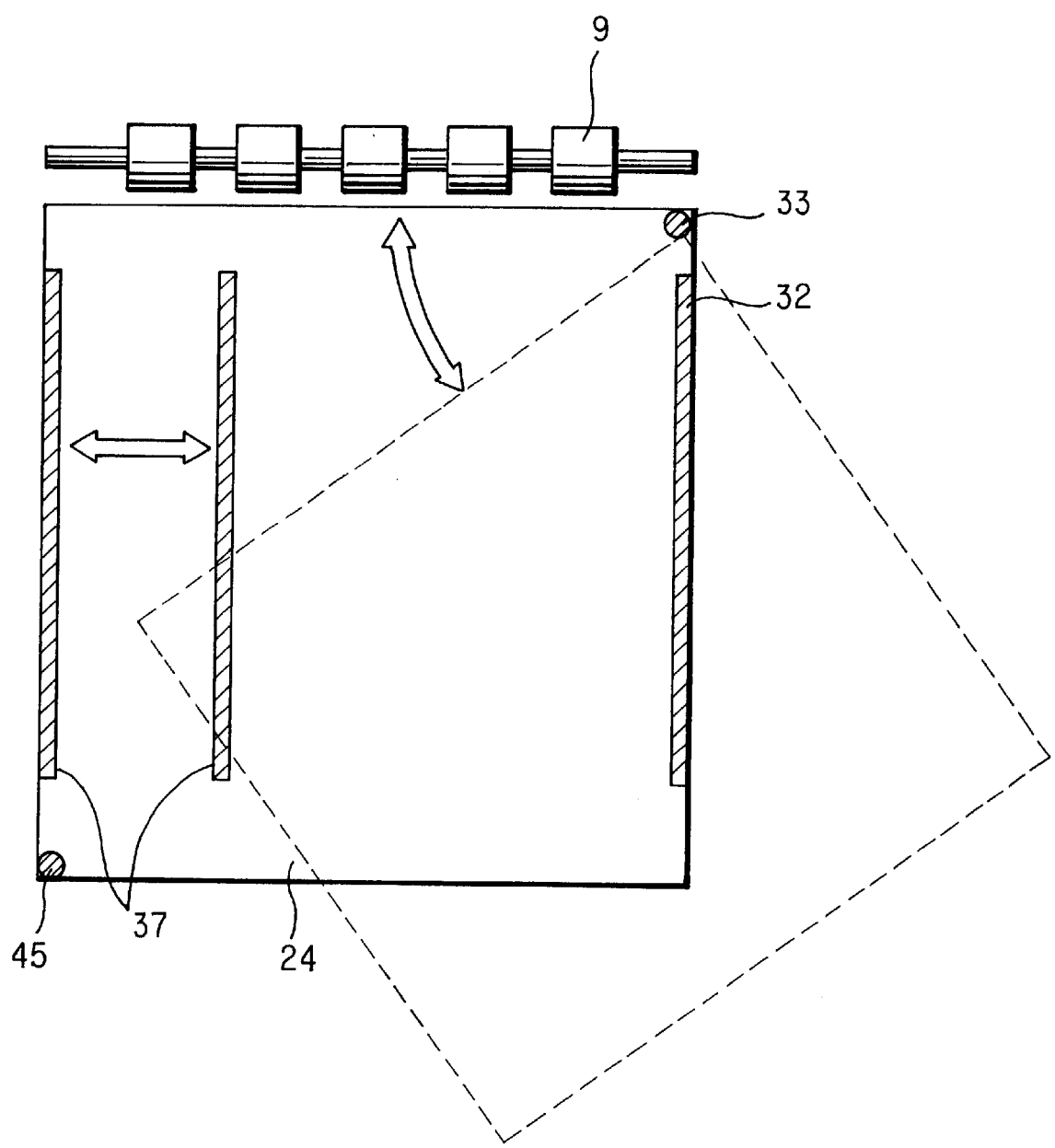
FIG. 9 is a top view showing the paper output tray.
Figure 10:
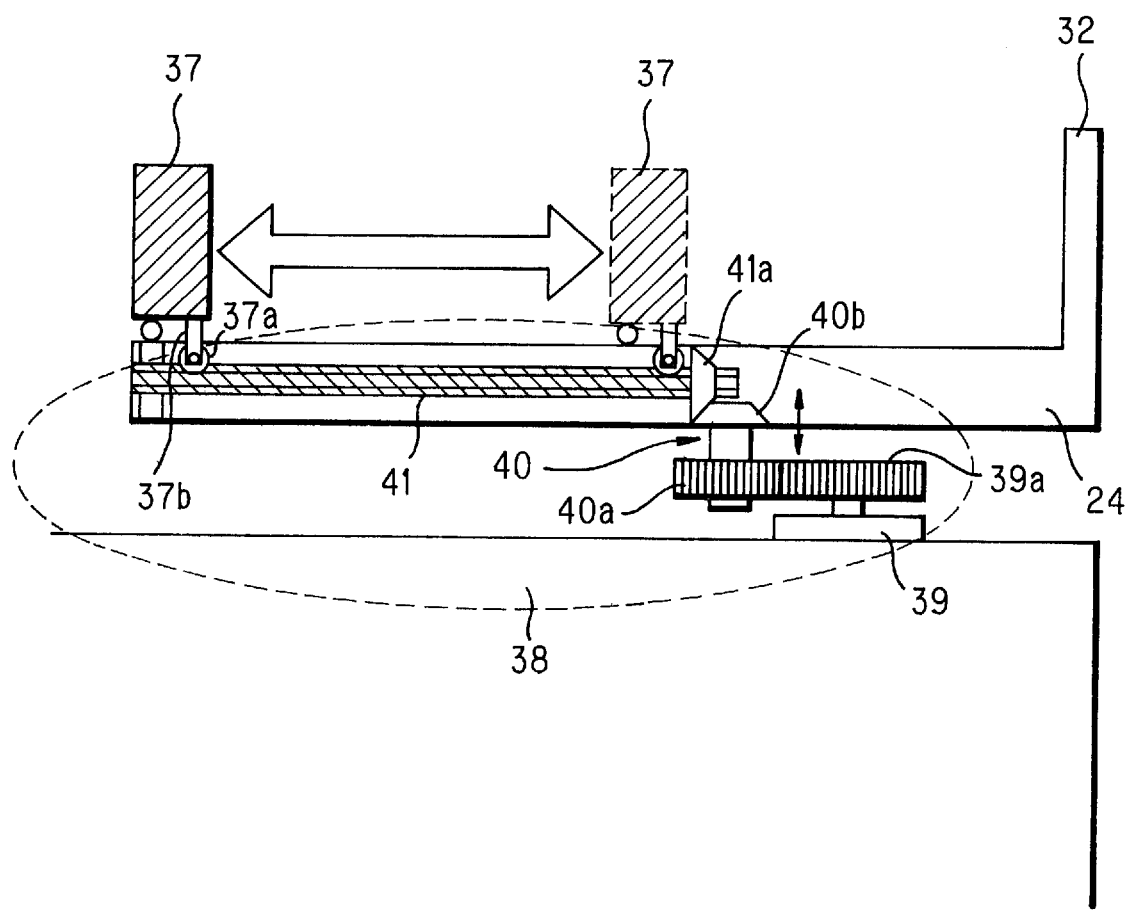
FIG. 10 is a sectional view showing the schematic configuration of a drive mechanism for driving the aligner disposed in the paper output tray for aligning printouts.

Next, the configuration for aligning the printed sheets P discharged to paper output tray 24 with respect to the direction perpendicular to the direction of conveyance will be described with reference to FIGS. 9 and 10. FIG. 9 is a top view showing paper output tray 24. FIG. 10 is a sectional view showing the overall arrangement of a drive mechanism in paper output tray 24 for driving an aligner 37 for aligning printed sheets P.

A flat plate aligner 37 is provided over the bottom face of paper output tray 24 substantially parallel with front shroud 32 of paper output tray 24. A drive mechanism 38 for aligner movement is arranged under paper output tray 24 on the main part side.

Drive mechanism 38 is comprised of a motor 39 having a vertical rotational shaft, a vertically arranged rotational shaft 40 having a gear 40a and bevel gear 40b at the ends thereof, a cylindrical shaft 41 which is screw grooved with a bevel gear 41a at one end thereof and arranged substantially horizontal and in parallel with the moving direction of aligner 37, a gear 37a coupled to the aligner by means of a shaft 37b below aligner 37.

Gear 39a on the rotational shaft of motor 39 and gear 40a mesh each other, bevel gear 40b and bevel gear 41a mesh each other, and the screw groove on shaft 41 and gear 37a mesh each other. The rotation of motor 39 is transmitted to aligner 37 by way of shafts 40 and 41 so that aligner 37 moves in the perpendicular direction to the conveying direction of printed paper P.

When printed sheet P is conveyed by paper discharge rollers 9 and placed on paper output tray 24, aligner 37 is moved to a predetermined position in accordance with the size of paper P being conveyed. Printed sheet P is urged by aligner 37 and positioned along the shroud 32. Thus the discharged printed sheet P can be aligned with respect to the direction perpendicular to the direction of conveyance.

Removal of paper output tray 24 can be done properly by providing a configuration so that meshing between gears 39a and 40a of drive mechanism 38 will be disengaged when paper output tray 24 is pulled out.

In this way, discharged printed sheets of paper P can be aligned both with respect to the direction of conveyance and the direction perpendicular to that by providing printout presser 34 and aligned 37 in paper output tray 24 and making them movable in conformity with the size of discharged paper. Therefore, printed sheets P can be handled more easily when they are picked up from paper output tray 24.

In the above configuration, support shaft 33 for pivoting paper output tray 24 is disposed at the right end on the front side of paper output tray 24. However, a support 45 for pivoting paper output tray 24 may be provided at the end portion diagonally opposite on paper output tray 24 to the position of support 33 as shown in FIG. 9, so that paper output tray 24 can be drawn out.

In this case, the door or shroud 32 can be pulled out by the left hand and then printed paper P can be taken out by the right hand, thus providing easy handling of paper output tray 24 for right-handed users.

The present invention produces the following effects.

The image forming apparatus includes: a main part having a printer portion and a paper feed portion; an original reading portion; and a paper output portion disposed under the original reading portion. The paper output portion of the image forming apparatus includes a paper output tray pivotally supported at one corner thereof so as to swivel in the horizontal plane. Therefore, it is possible for the user to easily pick up discharged printed sheets by pulling out the paper output tray without the necessity of bending over to check the paper output portion. Further, even if relatively small-sized print sheets such as postcards are used, the user will not miss picking them up. This contributes to improvement in handling the image forming apparatus.

In the present invention, since the paper output tray provided in the paper output portion has a transparent shroud which is formed upright with respect to the tray bottom for receiving printed paper, along the edge of the paper output tray on the front side of the main part, it is possible to easy monitor whether printouts are discharged on the paper output tray.

In the present invention, since an elastic element is provided for the paper output tray so that the tray is hooked to the main part of the image forming apparatus, the paper output tray will return to its original position by the function of the elastic element after its being drawn out. Thus, the user does not need to reset the paper output tray to the initial position after picking up printouts from the tray. This contributes to improvement in handling the image forming apparatus.

In the present invention, since the paper output tray provided in the paper output portion has an aligner for aligning printed sheets discharged from the image forming apparatus, a multiple number of discharged printed sheets in the paper output portion of the image forming apparatus can be aligned by the aligner. Therefore, the printed sheets picked up from the paper output tray can be handled easily.

In the present invention, since the paper output tray provided in the paper output portion has a movable aligner for aligning the printed sheets discharged from the image forming apparatus, by pressing them from the top, the printed sheets discharged in the paper output tray can be aligned with respect to the direction of discharge.

In the present invention, the paper output tray provided in the paper output portion has movable aligners which can move with respect to the sheet conveying direction and the direction perpendicular to it. Therefore, the printed sheets discharged in the paper output tray can be aligned along both the sheet conveying direction and the direction perpendicular to it.

What is claimed is:

1. An image forming apparatus comprising:
    a main part including a printer portion for printing the information of scanned originals and a paper feed portion for feeding print paper to the printer portion;
    an original reading portion for reading originals; and
    a paper output portion disposed under the original reading portion, the paper output portion including a paper output tray for receiving printed paper from the printer portion,
    wherein the paper output tray is pivotally supported at a corner thereof so as to swivel in the horizontal plane together with the printed paper received therein, and the original reading portion overlaps at least part of the paper output tray.

2. The image forming apparatus according to claim 1, wherein an elastic element is provided f or the paper output tray so that it is hooked to the main part.

3. The image forming apparatus according to claim 2, wherein the paper output tray has an aligner for aligning printed sheets.

4. The image forming apparatus according to claim 3, wherein the aligner is a moving presser for pressing the printed sheet from the top face thereof.

5. The image forming apparatus according to claim 3, wherein the aligner is a moving member which can move in the direction perpendicular to the conveyance direction of printed sheets.

6. The image forming apparatus according to claim 1, wherein the paper output tray has an aligner for aligning printed sheets.

7. The image forming apparatus according to claim 6, wherein the aligner is a moving presser for pressing the printed sheet from the top face thereof.

8. The image forming apparatus according to claim 6, wherein the aligner is a moving member which can move in the direction perpendicular to the conveyance direction of printed sheets.

9. An image forming apparatus comprising:
    a main part including a printer portion for printing the information of scanned originals and a paper feed portion for feeding print paper to the printer portion;
    an original reading portion for reading originals; and
    a paper output portion disposed under the original reading portion for receiving printed paper,
    characterized in that the paper output portion includes a paper output tray pivotally supported at a corner thereof so as to swivel in the horizontal plane, and the original reading portion overlaps at least part of the paper output tray, and
    wherein a transparent shroud is formed upright with respect to the tray bottom for receiving printed paper, along the edge of the paper output tray on the front side of the main part.

10. The image forming apparatus according to claim 9, wherein an elastic element is provided for the paper output tray so that it is hooked to the main part.

11. The image forming apparatus according to claim 10, wherein the paper output tray has an aligner for aligning printed sheets.

12. The image forming apparatus according to claim 11, wherein the aligner is a moving presser for pressing the printed sheet from the top face thereof.

13. The image forming apparatus according to claim 11, wherein the aligner is a moving member which can move in the direction perpendicular to the conveyance direction of printed sheets.

14. The image forming apparatus according to claim 9, wherein the paper output tray has an aligner for aligning printed sheets.

15. The image forming apparatus according to claim 14, wherein the aligner is a moving presser for pressing the printed sheet from the top face thereof.

16. The image forming apparatus according to claim 14, wherein the aligner is a moving member which can move in the direction perpendicular to the conveyance direction of printed sheets.

17. An image forming apparatus comprising:
a main part including a printer portion for printing the information of scanned originals and a paper feed portion for feeding print paper to the printer portion;
an original reading portion for reading originals; and
a paper output portion disposed in a space under the original reading portion for receiving printed paper and enclosed by the printer portion and paper feed portion, the paper output portion including a paper output tray for receiving the printed paper from the printer portion,
wherein the paper output tray is pivotally supported at a corner thereof so as to swivel in the horizontal plane together with the printed paper received therein.

* * * * *